US005078938A

United States Patent [19]

Munk et al.

[11] Patent Number: 5,078,938

[45] Date of Patent: Jan. 7, 1992

[54] METHOD AND APPARTUS FOR MAKING A MOLDED ARTICLE FROM A NONFLOWABLE MIXTURE OF CHIP AND/OR FIBER MATERIAL AND A THERMALLY HARDENABLE BINDER

[75] Inventors: Edmund Munk, Oberstenfeld; Helmuth Huber, Gronau, both of Fed. Rep. of Germany

[73] Assignee: Werzalit AG and Co., Ostenfeld, Fed. Rep. of Germany

[21] Appl. No.: 585,820

[22] Filed: Sep. 20, 1990

[30] Foreign Application Priority Data

Feb. 20, 1990 [EP] European Pat. Off. ........ 90103198.9

[51] Int. Cl.[5] .............................................. B29C 43/56

[52] U.S. Cl. ...................................... 264/109; 264/83; 264/101; 425/415; 425/420; 425/423

[58] Field of Search ................. 264/83, 102, 101, 109; 425/406, 415, 420, 423

[56] References Cited

U.S. PATENT DOCUMENTS

| | | | |
|---|---|---|---|
| 3,122,787 | 3/1964 | Adams | 425/423 |
| 3,280,237 | 10/1966 | Corbin et al. | 264/109 |
| 3,618,165 | 11/1971 | Hauser-Lienhard | 425/415 |
| 3,891,738 | 6/1975 | Shen | 264/101 |
| 4,162,877 | 7/1979 | Nyberg | 425/84 |
| 4,316,865 | 2/1982 | Battigelli et al. | 264/109 |
| 4,326,844 | 4/1982 | Kissel | 432/13 |
| 4,379,101 | 4/1983 | Smith | 264/40.3 |
| 4,393,019 | 7/1983 | Geimer | 264/83 |
| 4,517,147 | 5/1985 | Taylor et al. | 264/83 |
| 4,605,467 | 8/1986 | Bottger | 156/497 |
| 4,684,489 | 8/1987 | Walter | 264/101 |
| 4,850,849 | 7/1989 | Hsu | 425/407 |
| 4,913,872 | 4/1990 | Kiss | 264/320 |
| 4,923,656 | 5/1990 | Held | 264/70 |
| 4,937,024 | 6/1990 | Hickson | 264/83 |

*Primary Examiner*—Mary Lynn Theisen
*Attorney, Agent, or Firm*—Michael J. Striker

[57] ABSTRACT

The process for making a molded article from a nonflowable mixture of chip and/or fiber material and a thermally hardenable binder, includes pressing the mixture in a press with a mold closed on all its sides, hardening the mixture in the mold with thermal energy, and feeding a hot gas, especially steam, in the mixture during the pressing to supply at least a portion of the thermal energy required for hardening. To heat and harden the molded article in a minimum time, the hot gas is fed into the mixture in a direction substantially perpendicular to the pressing direction. Introduction of steam begins at least as soon as the onset of the pressing, but ends prior to the end of the pressing. A suitable apparatus for performing this process is described in which the mold cavity has walls containing feed ducts for the hot gas which feed the gas perpendicular to the pressing direction.

6 Claims, 2 Drawing Sheets

METHOD AND APPARTUS FOR MAKING A MOLDED ARTICLE FROM A NONFLOWABLE MIXTURE OF CHIP AND/OR FIBER MATERIAL AND A THERMALLY HARDENABLE BINDER

BACKGROUND OF THE INVENTION

The present invention relates to a process and apparatus for for making a molded article.

A method of making a molded article from a nonflowable mixture of chip and fiber material and thermally hardenable binder is known. In this process the mixture is pressed in a press with a mold closed on all of its sides and is hardened therein. A portion of the heat energy required for hardening is supplied by heated gas or steam fed to the mixture during the pressing.

This type of process has been described in German Patent Document DE-C 1 284 624. In this process break off of particles from the prepressed body must be avoided, because during the hot pressing step these particles then clog the ducts through which the steam and gases arising in the pressed mass are conducted away or through which hot gases are fed into the interior of the press mold. To solve this problem in the known method a plurality of recess are pressed into the pressed material in prepressing. These recesses are distributed over the surface of the pressed material at least one one of its sides.

On the other hand the present invention deals with a process for making a molded article from a nonflowable mixture, in which the molded body is pressed in a hot pressing process from the mixture. Indeed a feature of this process should be the rapid and uniform delivery of gas or steam to the closed mold, so that the pressing and hardening time is reduced to a minimum.

SUMMARY OF THE INVENTION

It is an object of the present invention to provide a method of making a molded article by pressing in a hot pressing process of the above-described type, in which the pressing and hardening time is reduced to a minimum.

According to the invention the hot gases or steam are fed into the mixture located in the mold in a direction which is substantially perpendicular to the pressing direction.

Introduction of steam begins at least as soon as the onset of the pressing, but ends prior to the end of the pressing.

In practice it has been found that the hot gases and steam can be applied to the mixture found in the mold in the shortest possible time and distributed there uniformly by this technique. That leads not only to a uniform distribution of the heat in the pressed material, but also to a quicker heating of the pressed material. This method is obviously required because the chip or fiber components of the pressed mass are deposited in the mold on filling it in such a way that the greatest number of chips or fibers are oriented at right angles to the pressing direction.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
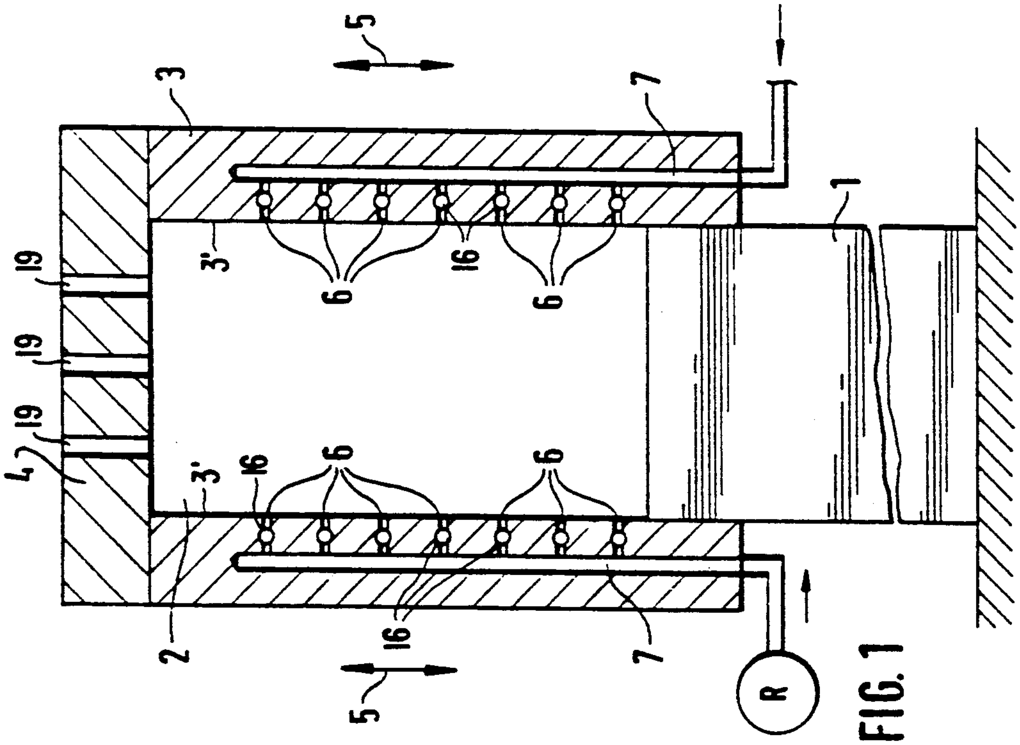
FIG. 1 is a cross sectional view through a press for making a plate-like molded article according to the present invention in the filled configuration.

The press shown in FIG. 1 has a stationary lower press tool 1. The press also comprises an upper press tool 3 mounted slidably on the stationary lower press tool 1. The surrounding upper press tool 3 moves vertically on the lower press tool 1 as indicated by the arrow 5. A mold cavity 2, which is bounded by the upper press tool 3 and the lower press tool 1, holds the material to be molded. A plurality of feed ducts 6 for the hot o gases and steam are provided in the walls 3' of the upper press tool 3 and are horizontally oriented. One end of the feed ducts 6 is connected to the mold cavity 2, while the other end is connected with a supply reservoir R for the hot gases and steam by supply line 7.

The process according to the present invention operates as follows:

After opening of the cover 4 the mold cavity 2 is filled with the mixture. Then the cover 4 is closed and a force in the vertical or pressing direction (arrow 5) is exerted on the upper press tool 3 with the cover 4. Simultaneously hot gases or steam is fed into the mixture filled in the press through the supply line 7 and the feed ducts 6. In this way the molded article 8 is pressed from the mixture and hardened—if necessary with additional heating of the upper and lower press tools 1 and 3 and the cover 4.

Figure 2:
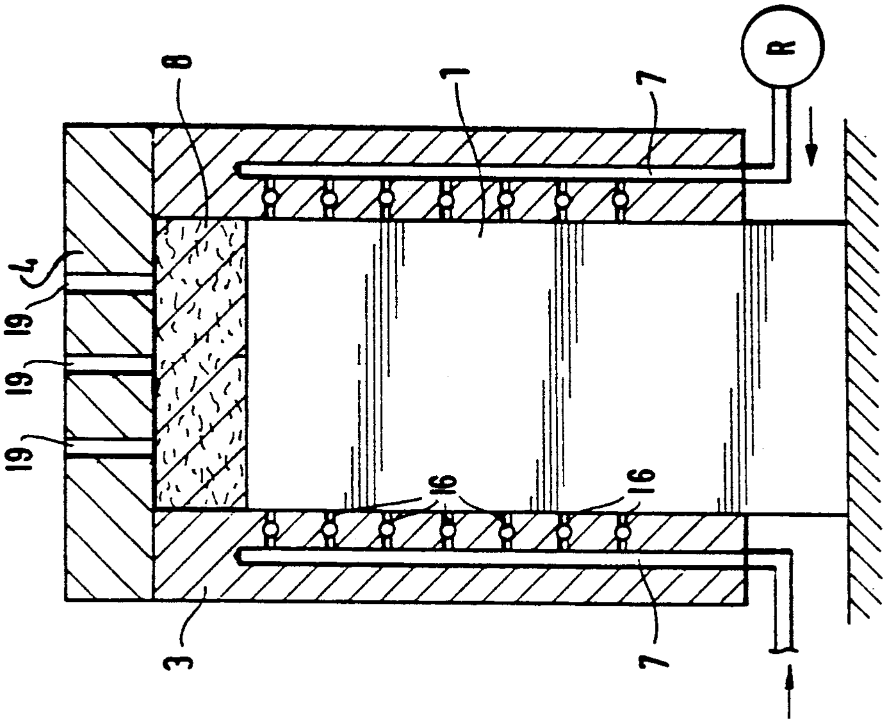
FIG. 2 is a cross sectional view through the press according to FIG. 1 after pressing to form the molded article.

FIG. 2 shows the press after the end of the pressing process. The molded article 8 has been forced out after opening of the cover 4. From FIG. 2 it is apparent that the feed ducts 6 are located in the upper press tool 3 only in the region, in which the upper press tool 3 is moved by the lower press tool 1. This means that the feed ducts 6 are positioned substantially below the top portion of the cavity in the upper press tool 3, so that the feed ducts are closed and steam is prevented from reaching the material being pressed prior to the end of the pressing step.

Figure 3:
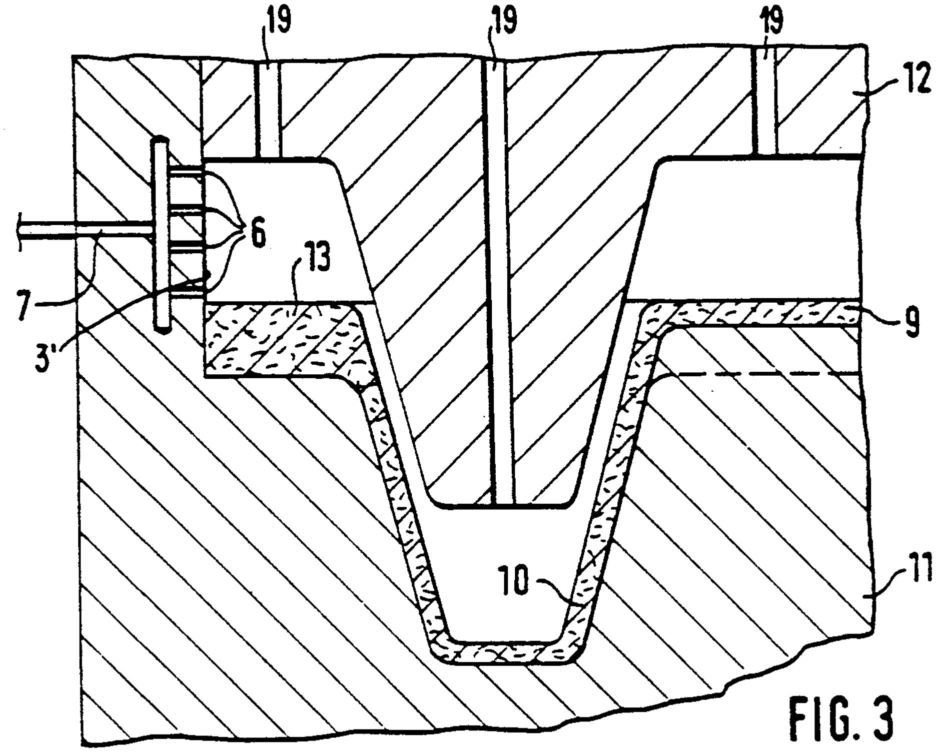
FIG. 3 is a cross sectional view through another embodiment of the press according to the present invention for making a palette.

FIG. 3 shows an apparatus for making a palette pressed from the mixture, in which the process of the invention is utilized to accelerate the pressing and hardening of the thick lip. The palette comprises a substantially flat plate 9, which has a plurality of pot-like bottom members 10. In this embodiment the press comprises a stationary lower press tool 11 and a moveable upper press tool 12. In the vicinity of the lip 13 of the palette the upper press tool 11 is provided with the feed ducts 6, which open at one end into the supply line 7.

Figure 4:
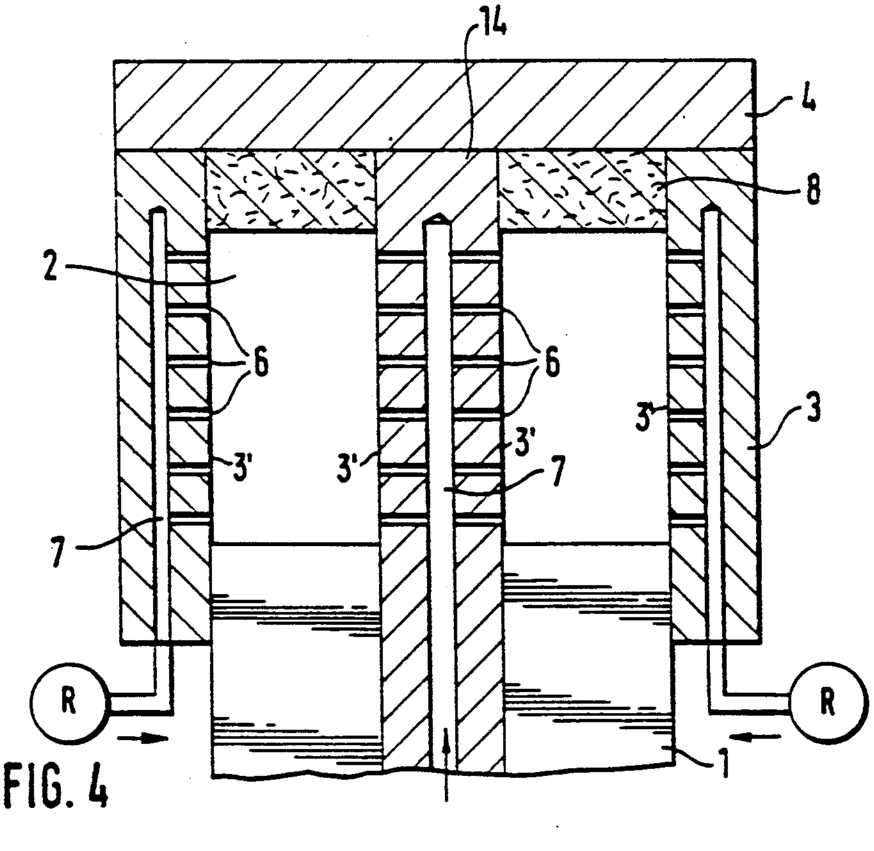
FIG. 4 is a cross sectional view through another embodiment of the press according to the present invention for making a round or circular article.

The apparatus according to FIG. 4 differs from that shown in FIGS. 1 and 2, since the upper press tool 3 has a central portion 14, which has another group of feed ducts 6 and a common supply line 7.

It is particularly desirable that the gases located in the molded article be removed quickly from the molded article and/or the press after the hot pressing. One possibility for accomplishing this is that reversible valves 16 are provided in the feed ducts. These valves should be controlled in such a way that after closing of the mold a path for exhaust the gas is opened. Another possibility is that one can provide gas exhaust ducts 19 in the lower press tool 1 and/or in the cover 4 through which gas or steam can be evacuated or vented.

It will be understood that each of the elements described above, or two or more together, may also find a useful application in other types of structures differing from the types described above.

While the invention has been illustrated and described as embodied in a process and apparatus for making a molded article, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. In a process for making a molded article from a nonflowable mixture of chip and/or fiber material and a thermally hardenable binder, comprising the steps of pressing said mixture in a press with a mold closed on all sides of said mold, said pressing occurring in a pressing direction, hardening said mixture in said mold with thermal energy, and feeding a hot gas in said mixture during said pressing to supply at least a portion of said thermal energy required for said hardening, the improvement comprising introducing said hot gas into said mixture found in said mold in a direction substantially perpendicular to said pressing direction, and wherein said feeding said hot gas in said mixture begins at least as soon as said pressing and terminates substantially prior to termination of said pressing.

2. The improvement as defined in claim 1, wherein said hot gas comprises steam.

3. The improvement as defined in claim 1, further comprising the steps of rapidly removing a portion of said gas from the molded article after the pressing.

4. An apparatus for making a molded article from a nonflowable mixture of chip and/or fiber material and a thermally hardenable binder, comprising a lower press tool and an upper press tool movable on said lower press tool over a portion of said lower press tool, said upper press tool and said lower press tool defining a mold cavity therebetween having at least one wall, said nonflowable mixture being pressed in said mold cavity to form said molded article, said upper press tool having a cover and being structured, so that said nonflowable mixture is intractable into said mold cavity, and said upper press tool being structured for motion on said lower pres tool in a pressing direction for pressing said mixture in said mold cavity to form said molded article, said upper press tool also having a plurality of feed ducts for said hot gas connected with said mold cavity, said feed ducts being oriented substantially perpendicular to said pressing direction for introduction of steam to said nonflowable mixture substantially perpendicular to said pressing direction, and a supply line connected with a supply reservoir for said hot gas, said supply line being connected with said feed ducts, wherein all of said feed ducts are covered and closed by said lower press tool during motion of said upper press tool in said pressing direction.

5. The apparatus according to claim 4, wherein said upper press tool is provided with a plurality of exhaust ducts for removing gas from said molded article after pressing.

6. The apparatus according to claim 4, wherein said upper press tool is provided with a plurality of reversible valves connected with said feed ducts, so that said feed ducts can also be used as exhaust ducts for removing gas from said molded article after pressing.

* * * * *